US009661696B1

(12) United States Patent
Chen et al.

(10) Patent No.: US 9,661,696 B1
(45) Date of Patent: May 23, 2017

(54) AC LED LIGHTING SYSTEMS AND CONTROL METHODS EFFICIENTLY PROVIDING OPERATING VOLTAGE

(71) Applicant: Analog Integrations Corporation, Hsin-Chu (TW)

(72) Inventors: Wei-Ming Chen, Hsin-Chu (TW); Jing-Chyi Wang, Hsin-Chu (TW)

(73) Assignee: Analog Integrations Corporation, Hsin-Chu (TW)

( * ) Notice: Subject to any disclaimer, the term of this patent is extended or adjusted under 35 U.S.C. 154(b) by 0 days.

(21) Appl. No.: 14/953,438

(22) Filed: Nov. 30, 2015

(51) Int. Cl.
 *H05B 33/08* (2006.01)
(52) U.S. Cl.
 CPC ....... *H05B 33/0812* (2013.01); *H05B 33/083* (2013.01)
(58) Field of Classification Search
 CPC ...... H05B 37/02; H05B 33/08; H05B 33/083; H05B 33/0815; H05B 33/0809; H05B 33/0848
 USPC ........ 315/121, 185 R, 186, 200 R, 291, 294, 315/307, 308, 312
 See application file for complete search history.

(56) References Cited

U.S. PATENT DOCUMENTS

| 8,384,307 | B2 * | 2/2013 | Grajcar | H05B 33/083 |
| | | | | 315/185 R |
| 9,066,392 | B2 * | 6/2015 | Lee | H05B 33/0809 |
| 2014/0197741 | A1 * | 7/2014 | Sakai | H05B 33/0824 |
| | | | | 315/123 |
| 2015/0245427 | A1 * | 8/2015 | Jung | H05B 33/0824 |
| | | | | 315/193 |

* cited by examiner

*Primary Examiner* — Thai Pham
(74) *Attorney, Agent, or Firm* — Winston Hsu; Scott Margo

(57) ABSTRACT

A LED lighting system efficiently provides an operating voltage powering integrated circuits. A LED string has LEDs segregated into LED groups connected in series. A LED controller has channel nodes connected to the cathodes of the LED groups respectively, and an output node connected to a capacitor providing the operating voltage. The LED controller drains a channel current from a selected channel node among the channel node. The LED controller regulates the channel current to a channel target value corresponding to the selected channel node, and provides a portion of the channel current as a charging current to power and regulate the operating voltage.

18 Claims, 6 Drawing Sheets

AC LED LIGHTING SYSTEMS AND CONTROL METHODS EFFICIENTLY PROVIDING OPERATING VOLTAGE

BACKGROUND

The present disclosure relates generally to Light-Emitting Diode (LED) lighting systems, and more particularly to Alternating Current (AC) driven LED lighting systems and control methods that efficiently provide an operating voltage.

Light-Emitting Diodes or LEDs are increasingly being used for general lighting purposes. In one example, a set of LEDs is powered from an AC power source and the term "AC LED" is sometimes used to refer to such circuit. Concerns for AC LED lighting systems include manufacture cost, power efficiency, power factor, flicker, lifespan, etc.

FIG. 1 demonstrates an AC LED lighting system 100 in the art. The AC LED lighting system 100 employs full-wave rectifier 18 to rectify an AC voltage $V_{AC}$ and provide a DC input voltage $V_{IN}$ at an input power line IN and a ground voltage at a ground line GND, where the ground voltage is deemed to be 0 volt in this system. A string of LEDs are segregated into LED groups $20_1$, $20_2$, $20_3$, and $20_4$, each having one or more LEDs. An integrated circuit 102 performing as a LED controller has pins or channel nodes $PIN_1$, $PIN_2$, $PIN_3$, and $PIN_4$, connected to the cathodes of LED groups $20_1$, $20_2$, $20_3$, and $20_4$ respectively. Inside integrated circuit 102 are path switches $SG_1$, $SG_2$, $SG_3$, and $SG_4$, and a current controller 103 as well. When the input voltage $V_{IN}$ at the input power line IN increases, current controller 103 can adjust the conductivity of path switches $SG_1$, $SG_2$, $SG_3$, and $SG_4$, making more LED groups join to emit light. Operations of integrated circuit 102 have been exemplified in U.S. Pat. No. 7,708,172 and are omitted here for brevity.

There in FIG. 1 includes a low dropout linear regulator (LDO) 112, which drains current from input power line IN to charge capacitor $C_{OUT}$, so operating voltage $V_{CC}$ is built up at a power source line VCC for powering integrated circuit 102 or other integrated circuits, such as microcontroller units. The LDO 112 is power consuming, however. The voltage drop across the LDO 112 could be as high as several hundred volts, so the power consumed by the LDO 112 will become significant.

BRIEF DESCRIPTION OF THE DRAWINGS

The invention can be more fully understood by the subsequent detailed description and examples with references made to the accompanying drawings, wherein.

DETAILED DESCRIPTION

The following embodiments are described in sufficient detail to enable those skilled in the art to make and use the invention. It is to be understood that other embodiments would be evident based on the present disclosure, and that improves or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known configurations and process steps are not disclosed in detail.

Figure 1:
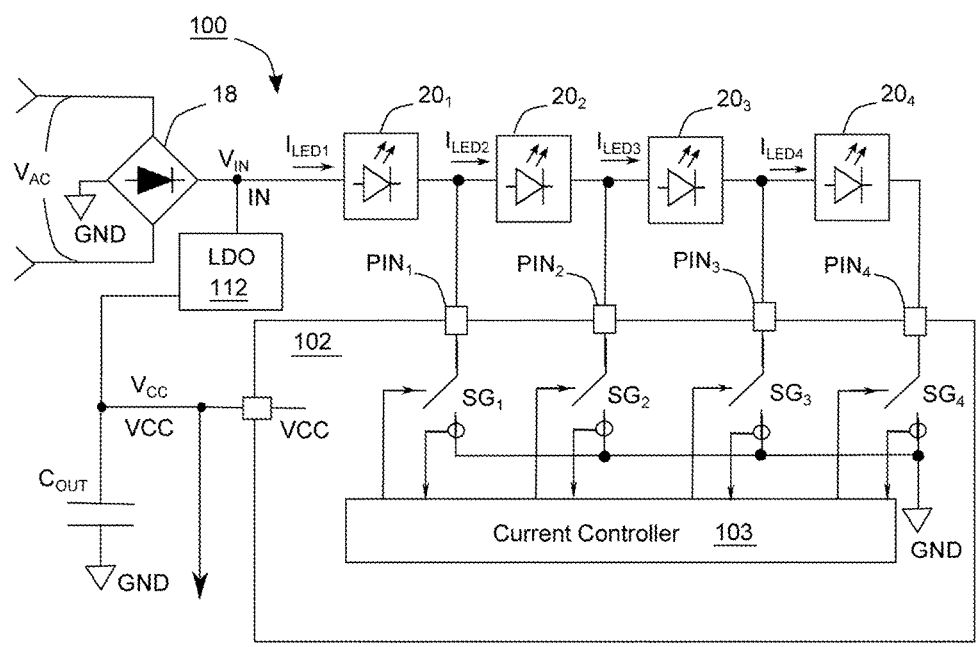
FIG. 1 demonstrates an AC LED lighting system in the art.
Figure 2:
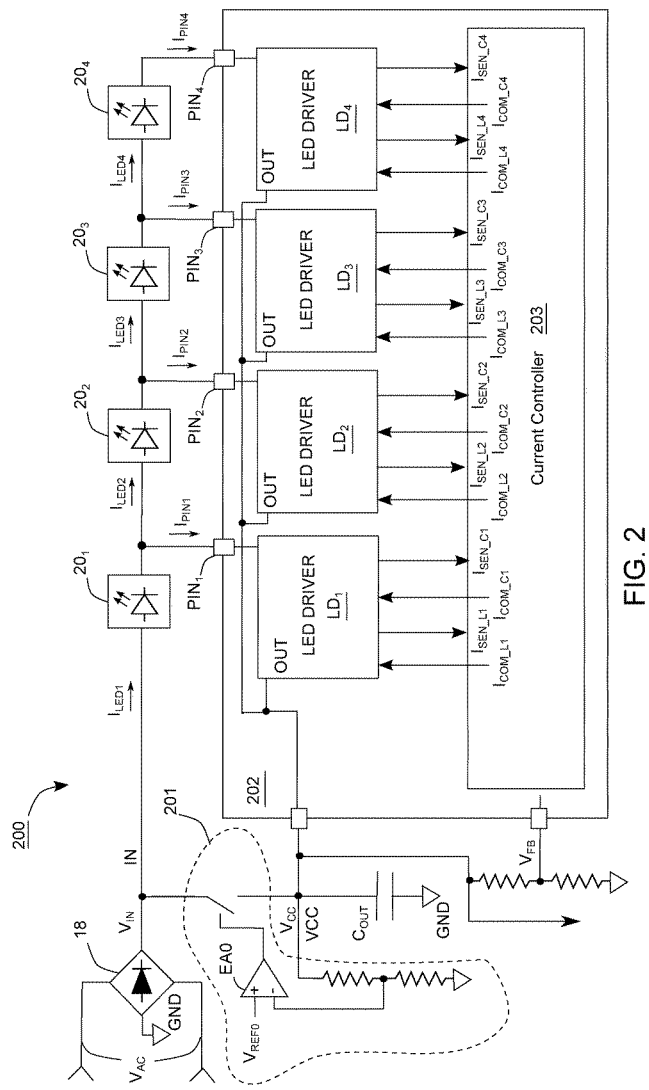
FIG. 2 demonstrates an AC LED lighting system according to embodiments of the invention.

FIG. 2 demonstrates an AC LED lighting system 200 according to embodiments of the invention. The AC LED lighting system 200 has a full-wave rectifier 18 to rectify a sinusoid AC input voltage $V_{AC}$, and provides a rectified input voltage $V_{IN}$ at the input power line IN and a ground voltage at the ground line GND. The LED groups $20_1$, $20_2$, $20_3$ and $20_4$ together compose a LED string connected in series between the input power line IN and the ground line GND. FIG. 2 exemplifies a LED string with 4 LED groups, but other embodiments might have more or less LED groups to compose a LED string. The LED string in FIG. 2 is deemed to have a most upstream anode connected to the input power line IN and a most downstream cathode connected to channel node $PIN_4$. Each LED group might have only one LED in some embodiments, or consist of several LEDs connected in parallel or in series, depending on its application. The LED group $20_1$ is the most upstream LED group in FIG. 2 as its anode is connected to the rectified input voltage $V_{IN}$, the highest voltage in the LED string. Analogously, the LED group $20_4$ is the most downstream LED group in FIG. 2. A downstream LED group uses its anode to connect with the cathode of an upstream LED. LED currents $I_{LED1}$-$I_{LED4}$ denote the currents passing through LED groups $20_1$-$20_4$, respectively.

LDO 201 drains current directly from input power line IN to charge capacitor $C_{OUT}$, so operating voltage $V_{CC}$ is built up at a power source line VCC for powering integrated circuit 202 or other integrated circuits, such as a micro control unit. It will become apparent later that LDO 201 charges capacitor $C_{OUT}$ only during startup or when operating voltage $V_{CC}$ is very low. As LDO 201 conducts no current for most of time, it consumes very little or ignorable power.

An integrated circuit 202 performs as a LED controller, and has LED drivers $LD_1$, $LD_2$, $LD_3$ and $LD_4$, and a current controller 203. LED driver $LD_2$ is a relatively upstream LED driver in view of LED driver $LD_3$, and is also a relatively downstream LED driver in view of LED driver $LD_1$, for example. Channel currents $I_{PIN1}$-$I_{PIN4}$ denote the currents entering the integrated circuit 202 via channel nodes $PIN_1$-$PIN_4$, respectively. Each of LED drivers $LD_1$, $LD_2$, $LD_3$ and $LD_4$ has an output node OUT commonly short to power source line VCC. As LED drivers $LD_1$, $LD_2$, $LD_3$ and $LD_4$ are similar or the same with each other, one of them might be detailed while the others are comprehensible based on the teaching of the detailed one.

Channel current $I_{PIN1}$ for instance, flows into LED driver $LD_1$, and splits into charging current $I_{L1}$ and driving current $I_{C1}$. Charging current $I_{L1}$ goes to the output node OUT of LED driver $LD_1$, charging the capacitor $C_{OUT}$, while driving current $I_{C1}$ follows another path to the ground line GND. In one embodiment, LED drivers $LD_1$ has a LDO using charging current $I_{L1}$ to power and regulate operating voltage $V_{CC}$, while the channel current $I_{PIN1}$ is regulated to be a channel target value $IA_{CHL1}$ represented by target signal $I_{COM\_L1}$.

Figure 3:
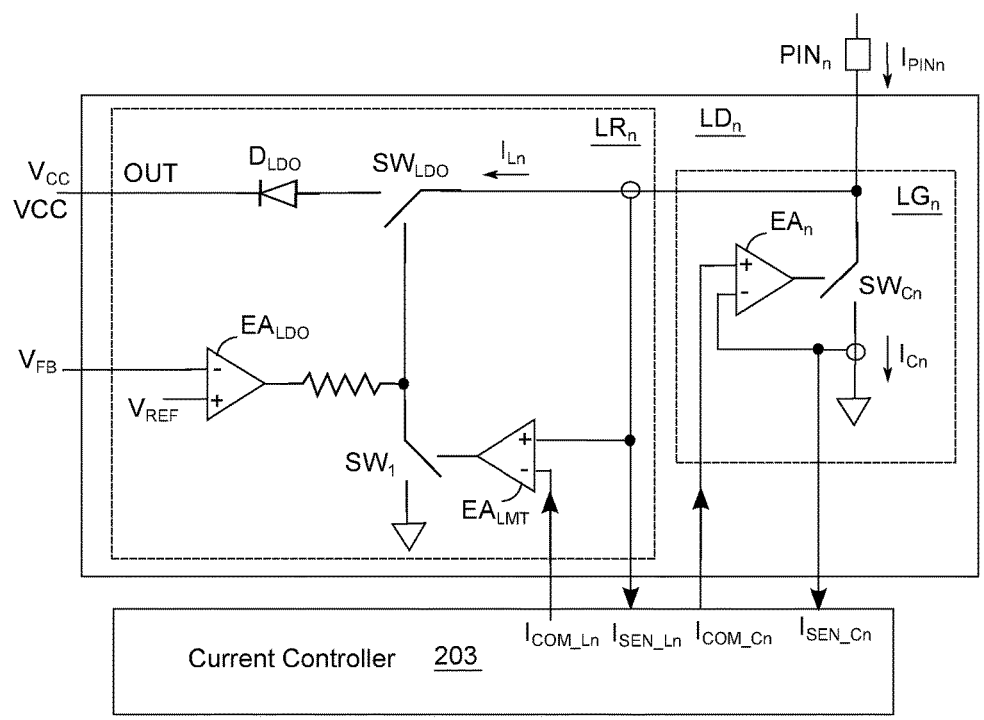
FIG. 3 demonstrates a LED driver in association with the current controller in FIG. 2.

FIG. 3 demonstrates a LED driver $LD_n$ in association with current controller 203, where n could be 1, 2, 3, or 4, meaning LED driver $LD_n$ might embody any one of the LED drivers $LD_1$, $LD_2$, $LD_3$ and $LD_4$ in FIG. 2. The current controller 203 provides target signals $I_{COM\_Ln}$ and $I_{COM\_Cn}$ to LED driver $LD_n$, and receives current sense signals $I_{sEN\_Ln}$ and $I_{SEN\_cn}$ from LED driver $LD_n$. LED driver $LD_n$ drains channel current $I_{PINn}$ and tries to regulate it to be the channel target value $IA_{cHLn}$ represented by target signals $I_{COM\_Ln}$.

LED driver $LD_n$ includes current regulator $LG_n$ and LDO $LR_n$, for providing driving current $I_{Cn}$ and charging current $I_{Ln}$ respectively, each originating from the channel current $I_{PINn}$.

The LDO $LR_n$ has two error amplifiers $EA_{LDO}$ and $EA_{LMT}$. Derivable from FIG. 3 in view of FIG. 2, the LDO $LR_n$ monitors operating voltage $V_{CC}$ via feedback voltage $V_{FB}$ at a feedback node FB to control LDO switch $SW_{LDO}$. LDO switch $SW_{LDO}$ and diode $D_{LDO}$ are connected in series between node $PIN_n$ and the capacitor $C_{OUT}$. If the operating voltage $V_{CC}$ is less than a target voltage $V_{TAR\_CC}$ represented by the reference voltage $V_{REF}$, error amplifiers $EA_{LDO}$ turns ON LDO switch $SW_{LDO}$ to conduct charging current $I_{Ln}$ as large as possible, where charging current $I_{LE}$ accordingly charges the capacitor $C_{OUT}$ and increases the operating voltage $V_{CC}$. The magnitude of the charging current $I_{Ln}$ is limited, though. The error amplifier $EA_{LMT}$ senses the charging current $I_{Ln}$ via current sense signal $I_{SEN\_Ln}$, and makes the charging current $I_{Ln}$ no more than channel target value $IA_{cHLn}$ represented by the target signal $I_{COM\_Ln}$, because switch $SW_1$ reduces the conductivity of LDO switch $SW_{LDO}$ when sense signal $I_{SEN\_Ln}$ exceeds target signal $I_{COM\_Ln}$.

Each switch in this specification could be embodied by a transistor, such as a BJT, a MOS transistor or a JFET.

The current regulator $LG_n$ has a channel switch $SW_{Cn}$ and an error amplifier $EA_n$. Derivable from FIG. 3, the current regulator $LG_n$ is configured for conducting and regulating the driving current $I_{Cn}$ to be a supplementary target value $IA_{SUPn}$ represented by target signal $I_{COM\_Cn}$.

Sense signals $I_{SEN\_Ln}$ and $I_{SEN\_cn}$, generated by sensing charging current $I_{Ln}$ and driving current $I_{Cn}$ respectively, are not limited to be generated from the locations specified in FIG. 3. As sense signals $I_{SEN\_Ln}$ represents the magnitude of charging current $I_{Ln}$, it could be generated by sensing somewhere in the path connecting the LDO switch $SW_{LDO}$ and diode $D_{LDO}$, for example.

The current controller 203 controls and provides target signals $I_{COM\_Ln}$ and $I_{COM\_cn}$. The determination of target signal $I_{COM\_Ln}$ will be detailed later. Target signal $I_{COM\_Cn}$ is determined by the current sense signal $I_{SEN\_Ln}$ and the channel target value $IA_{CNLn}$. The supplementary target value $IA_{SUPn}$ represented by the target signal $I_{COM\_Cn}$ is equal to the channel target value $IA_{CNLn}$ minus the charging current $I_{Ln}$. As the channel current $I_{PINn}$ is the combination of the charging current $I_{Ln}$ and driving current $I_{Cn}$, and the driving current $I_{Cn}$ is regulated to be the channel target value $IA_{CNLn}$ minus the charging current $I_{Ln}$, the channel current $I_{PINn}$ is about regulated to be the channel target value $IA_{CNLn}$, represented by target signal $I_{COM\_Ln}$.

In other words, the channel current $I_{PINn}$ can be regulated to the channel target value $IA_{CNLn}$, and meanwhile a portion of the channel current $I_{PINn}$ could be directed to be a charging current $I_{Ln}$ for charging the capacitor $C_{OUT}$ and regulating the operating voltage $V_{CC}$.

The current controller 203 sends target signal $I_{COM\_Ln}$ to seemingly turn ON or OFF the LED driver $LD_n$. If the channel target value $IA_{CNLn}$ represented by target signal $I_{COM\_Ln}$ is 0 mA, the LED driver $LD_n$ seems to be turned OFF, because the channel current $I_{PINn}$ is going to be 0 mA. If the channel target value $IA_{CNLn}$ is 50 mA, for example, the LED driver $LD_n$ seems to be turned ON, trying to regulate the channel current $I_{PINn}$ to be 50 mA. The channel current through a turned-ON LED driver might not be well regulated nevertheless and it depends on whether the voltage at the channel node connected to the turned-ON LED driver is high enough for regulation.

LDO $LR_N$ is capable of regulating the operating voltage $V_{CC}$ to the target voltage $V_{TAR\_CC}$ only if the LED driver $LD_n$ is turned ON by the current controller 203. A turned-OFF LED driver $LD_n$ cannot regulate the operating voltage $V_{CC}$ because the charging current $I_{Ln}$ will become zero.

The current controller 203 determines the channel target value $IA_{CNLn}$ based on the current sense signals of the LED driver $LD_n$ and the neighboring, downstream LED driver $LD_{n+1}$. An initial condition is supposed that the current controller 203 happens to turn ON the LED driver $LD_n$ and all the LED drivers relatively downstream to the LED driver $LD_n$, i.e. $LD_{n+1}$, $LD_{n+2}$, etc., but turn OFF all the LED drivers relatively upstream to the LED driver $LD_n$, i.e. $LD_{n-1}$, $LD_{n-2}$, etc., and the channel target value $IA_{CNLn}$ is 50 mA. Meanwhile, the LED driver $LD_n$ is the most upstream one among the turned-ON LED drivers, so LED groups $20_1$-$20_n$ are driven to illuminate together.

In one case that the channel current $I_{PINn}$ nevertheless is found unable to be regulated, or very below 50 mA, it implies the input voltage $V_{IN}$ is too low for LED driver $LD_n$ to generate the channel current $I_{PINn}$ with a magnitude of 50 mA. Based on the finding, the current controller 203 then further turns ON the LED driver $LD_{n-1}$, which requires a lower input voltage $V_{IN}$ for regulation. Accordingly, LED driver $LD_{n-1}$ now becomes the most upstream turned-ON LED driver, LED group $20_n$ stops illuminating but LED groups $20_1$-$20_{n-1}$ continues.

In another case that the channel current $I_{PINn}$ is being well regulated to be the channel target value $IA_{CNLn}$ of 50 mA, and the neighboring, downstream channel current $I_{PINn+1}$ starts increasing from 0 mA, it implies that the input voltage $V_{IN}$ now becomes high enough for the downstream LED driver $LD_{n+1}$ to regulate the downstream channel current $I_{PINn+1}$. Accordingly, the current controller 203 then turns OFF the LED driver $LD_n$ (by setting the channel target value $IA_{CNLn}$ 0 mA) and lets downstream LED driver $LD_{n+1}$ kept ON. As a result, LED group $20_{n+1}$ joins LED groups $20_1$-$20_n$ to illuminate.

Figure 4:
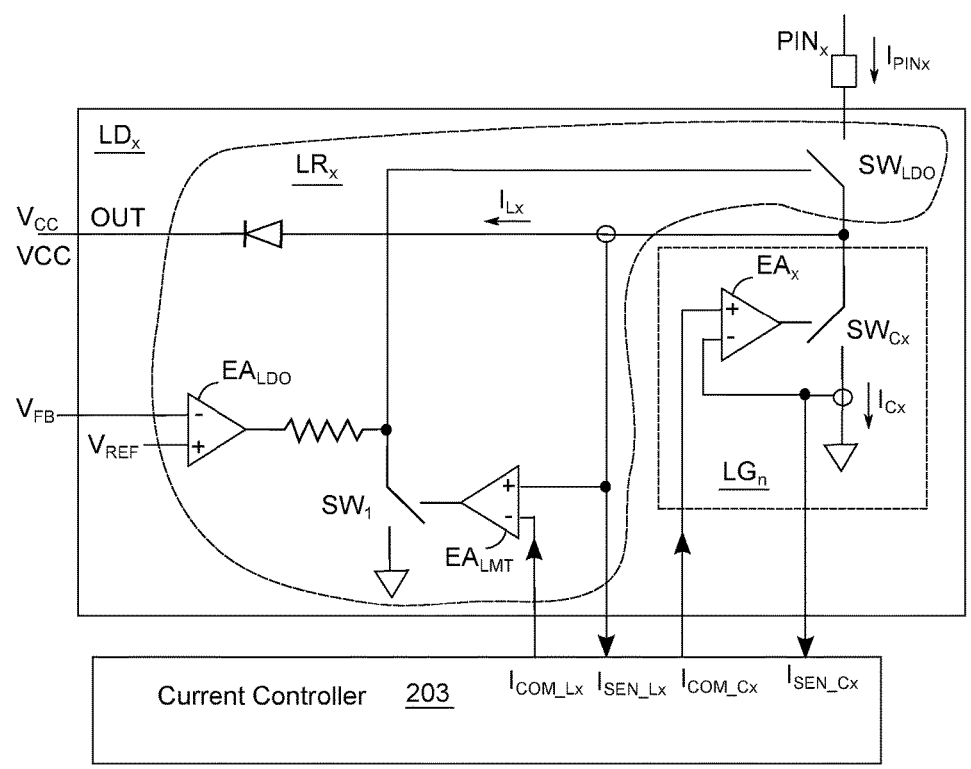
FIG. 4 demonstrates another LED driver in association with the current controller in FIG. 2.

FIG. 4 demonstrates another LED driver $LD_x$ in association with current controller 203, where x could be 1, 2 3, or 4, meaning LED driver $LD_x$ could embody any one of the LED drivers $LD_1$, $LD_2$, $LD_3$ and $LD_4$ in FIG. 2. Different from FIG. 3, where the channel node $PIN_x$ is a common node connecting LDO switch $SW_{LDO}$ and channel switch $SW_{cn}$, FIG. 4 has LDO switch $SW_{LDO}$ and channel switch $SW_{Cx}$ connected in series between channel node $PIN_x$ and the ground line GND. The operation of LED driver $LD_x$ in FIG. 4 is comprehensible based on the teaching of LED driver $LD_n$ in FIG. 3, and is omitted herein for brevity.

Please refer to FIG. 2 in view of FIG. 3 or 4. In one embodiment, LDO 201 is configured for regulating the operating voltage $V_{CC}$ to a target voltage, which for example is 4.5V, and the LDOs in LED drivers $LD_1$-$LD_4$ are all configured for regulating the operating voltage $V_{CC}$ to another target voltage, which is 5V for example. During a startup procedure when the operating voltage $V_{CC}$ is below 4.5V, LDOs 201 and $LR_1$-$LR_4$ all work together to pull up operating voltage $V_{CC}$. When the operating voltage $V_{cc}$ exceeds 4.5V, LDO 201 stops charging the capacitor $C_{OUT}$ but at least one of LDOs $LR_1$-$LR_4$ continues regulating the operating voltage $V_{CC}$ to 5V. During a normal operation, the operating voltage $V_{CC}$ remains 5V and is powered by the LDO of the most upstream one among turned-ON LED drivers. For example, if LED drivers $LD_3$ and $LD_4$ are ON and LED drivers $LD_1$ and $LD_2$ OFF, then the LDO $LR_3$ in LED driver $LD_3$ is substantially in charge of regulating the operating voltage $V_{CC}$ to 5V while LDOs $LR_1$ and $LR_2$ are OFF and LDO $LR_4$ hardly provides any charging current because of the too-low voltage at the channel node $PIN_4$. As one LDO in LED drivers $LD_1$-$LD_4$, if turned ON, could power the operating voltage $V_{CC}$ by providing a charging current from a corresponding channel node, whose voltage is at least several forward voltages lower than input voltage $V_{IN}$, the LDO in one LED driver works much more efficient than LDO 201 whose efficiency suffers due to the high voltage difference between input voltage $V_{IN}$ and operating voltage $V_{CC}$.

Figure 5:
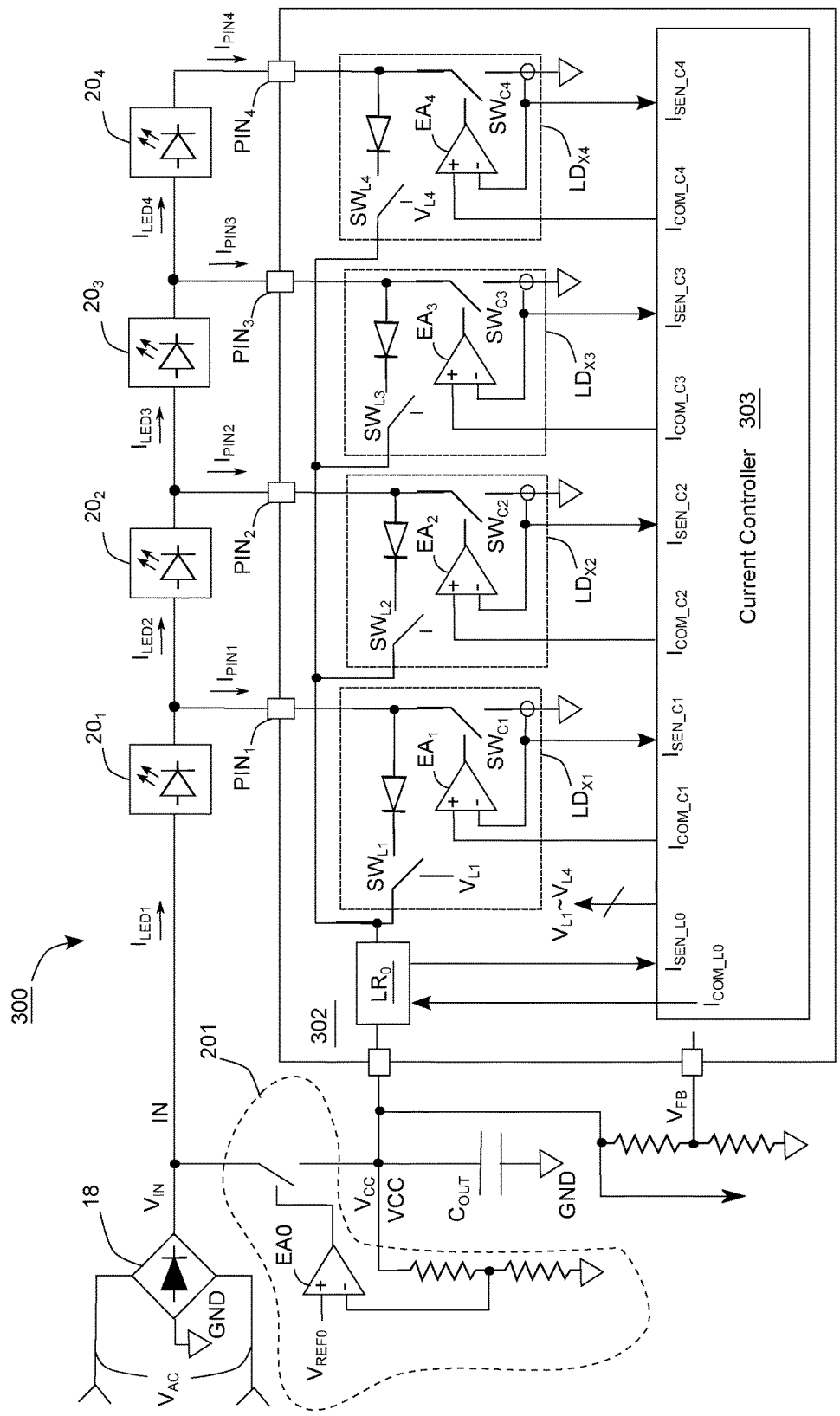
FIG. 5 demonstrates another AC LED lighting system according to embodiments of the invention.

Each of LED drivers $LD_n$ and $LD_x$ in FIGS. 3 and 4 includes a LDO, but this invention is not limited to however. In some embodiments of the invention, a LED driver might have no LDO. FIG. 5 demonstrates another AC LED lighting system 300 according to embodiments of the invention, where an integrated circuit 302 as a LED controller has LED drivers $LD_{X1}$, $LD_{X2}$, $LD_{X3}$ and $LD_{X4}$, a LDO $LR_0$, and a current controller 303. Please note that each of LED drivers $LD_{X1}$, $LD_{X2}$, $LD_{X3}$ and $LD_{X4}$ in FIG. 5 has no LDO.

Figure 6:
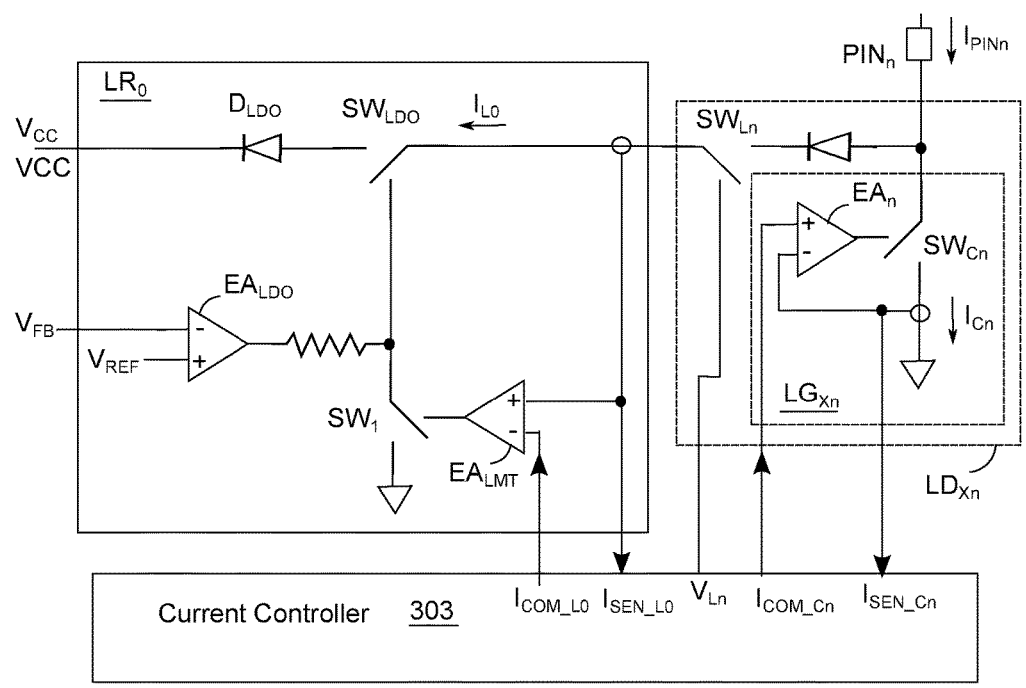
FIG. 6 demonstrates a LED driver and a LDO, in association with the current controller in FIG. 5.

FIG. 6 demonstrates a LED driver $LD_{Xn}$ and the LDO $LR_0$, in association with current controller 303, where LED driver $LD_{Xn}$ could embody any one of the LED drivers $LD_{X1}$, $LD_{X2}$, $LD_{X3}$ and $LD_{X4}$ in FIG. 5. Current controller 303 sends target signal $I_{SEN\_L0}$ to LDO $LR_0$ and receives current sense signal $I_{SEN\_L0}$ from it. Current controller 303 further sends control signal $V_{in}$ and target signal $I_{COM\_L0}$ to LED driver $LD_{Xn}$ and receives current sense signal $I_{SEN\_Cn}$ from it.

LED driver $LD_{Xn}$ is turned OFF by turning OFF selection switch $SW_{Ln}$ and setting target signal $I_{COM\_Cn}$ to represent 0 mA. LED driver $LD_{Xn}$ is turned ON by turning ON the selection switch $SW_{Ln}$ via control signal $V_{Ln}$. As for the target signal $I_{COM\_Cn}$, if LED driver $LD_{Xn}$ is the most upstream one among the turned-ON LED drivers, then target signal $I_{COM\_L0}$ is set to represent channel target value $IA_{CNLn}$, which is 50 mA for example, and the target signal $I_{COM\_Cn}$ is set to represent the channel target value $IA_{CNLn}$ minus the current sense signal $I_{SEN\_L0}$, so as to regulate the channel current $I_{PINn}$ to the channel target value $IA_{CNLn}$. If LED driver $LD_{Xn}$ is a turned-ON one but not the most upstream turned-ON one, then the target signal $I_{COM\_Cn}$ is set to represent 10 mA, for example, so current controller 303 could receive current sense signal $I_{SEN\_Cn}$ to determine whether input voltage is high enough for further driving another LED group.

Please refer to FIG. 5 in view of FIG. 6. Analogous to the current controller 203 in FIG. 2, current controller 303 can further turn ON a neighboring, upstream LED driver if input voltage $V_{IN}$ falls and the channel current of the most upstream turned-ON LED driver almost diminishes. Similarly, current controller 303 can turn OFF the most upstream turned-ON LED driver and let a neighboring downstream LED driver take over if the channel current of the neighboring downstream LED driver increases to a certain level.

FIG. 5, similar with FIG. 2, is beneficial in efficiency of generating operating voltage $V_{CC}$. Operating voltage $V_{CC}$ is regulated to 5 volts by LDO $LR_0$ inside the integrated circuit 302, and LDO 201 normally does not power operating voltage $V_{CC}$, voiding high power consumption. The charging current $I_{L0}$ that LDO $LR_0$ provides for regulation of operating voltage $V_{CC}$ is from the most upstream LED driver among the turned-ON ones, and has been utilized efficiently for driving at least one LED group.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LED controller for driving a LED string with LEDs connected in series to have anodes and cathodes, wherein a most upstream anode among the anodes is coupled to an input power line, comprising:
   a first LED driver, coupled to a first cathode among the cathodes, for draining a first channel current from the first cathode, and providing a first charging current from the first channel current to charge a capacitor for powering an operating voltage power line with an operating voltage; and
   a current controller for controlling the first LED driver;
   wherein the current controller controls the first LED driver to regulate the first channel current to a first channel target value; and
   wherein the first LED driver comprises a primary low dropout linear regulator (LDO) monitoring the operating voltage to control the first charging current and making the first charging current not more than the first channel target value.

2. The LED controller of claim 1, wherein the current controller provides a first target signal to the primary LDO, and the first target signal corresponds to the first channel target value.

3. The LED controller of claim 2, wherein the primary LDO comprises a LDO switch and a diode connected in series between the first cathode and the capacitor, and the first LED driver further comprises a first channel switch for conducting and regulating a first driving current from the first channel current.

4. The LED controller of claim 3, wherein the LDO switch is for regulating the first charging current, and the first cathode is a common node connecting the LDO switch and the first channel switch.

5. The LED controller of claim 3, wherein the LDO switch and the first channel switch are connected in series between the first cathode and a ground line, and the LDO switch is for regulating the first channel current.

6. The LED controller of claim 3, wherein the first LED driver comprises a first current regulator with the first channel switch, and the current controller provides to the first current regulator a second target signal corresponding to the first channel target value minus the first charging current.

7. The LED controller of claim 1, comprising:
   a plurality of LED drivers, each coupled to a corresponding cathode, for draining a channel current from the corresponding cathode, and providing a charging current to charge the capacitor for powering the operating voltage power line with the operating voltage;
   wherein the current controller controls the LED drivers;
   wherein the charging current is sensed to control a driving current from the channel current, so as to make the channel current about a corresponding channel target value.

8. The LED controller of claim 7, wherein each LED driver comprises the primary LDO monitoring the operating voltage to control the charging current and making the charge current not more than the corresponding channel target value.

9. A LED lighting system, comprising:
the LED string and the LED controller of claim 1, wherein the primary LDO regulates the operating voltage to a first target voltage; and
a secondary LDO connected to the most upstream anode for charging the capacitor and regulating the operating voltage to a second target voltage less than the first target voltage.

10. A LED lighting system, comprising:
a LED string with LEDs segregated into LED groups connected in series, each LED group having a cathode and an anode;
a LED controller comprising:
a first LED driver, coupled to a first cathode among the cathodes, for draining a first channel current from the first cathode, and providing a first charging current from the first channel current to charge a capacitor for powering an operating voltage power line with an operating voltage; and
a current controller for controlling the first LED driver;
wherein the current controller controls the first LED driver to regulate the first channel current to a first channel target value; and
wherein the first LED driver comprises a primary low dropout linear regulator (LDO) monitoring the operating voltage to control the first charging current and making the first charging current not more than the first channel target value.

11. The LED lighting system of claim 10, wherein the current controller provides a first target signal to the primary LDO, and the first target signal corresponds to the first channel target value.

12. The LED lighting system of claim 11, wherein the primary LDO comprises a LDO switch and a diode connected in series between the first cathode and the capacitor, and the first LED driver further comprises a first channel switch for conducting and regulating a first driving current from the first channel current.

13. The LED lighting system of claim 12, wherein the LDO switch is for regulating the first charging current, and the first cathode is a common node connecting the LDO switch and the first channel switch.

14. The LED lighting system of claim 12, wherein the LDO switch and the first channel switch are connected in series between the first cathode and a ground line, and the LDO switch is for regulating the first channel current.

15. The LED lighting system of claim 12, wherein the first LED driver comprises a first current regulator with the first channel switch, and the current controller provides to the first current regulator a second target signal corresponding to the first channel target value minus the first charging current.

16. The LED lighting system of claim 10, comprising:
a plurality of LED drivers, each coupled to a corresponding cathode, for draining a channel current from the corresponding cathode, and providing a charging current to charge the capacitor for powering the operating voltage power line with the operating voltage;
wherein the current controller controls the LED drivers;
wherein the charging current is sensed to control a driving current from the channel current, so as to make the channel current about a corresponding channel target value.

17. The LED lighting system of claim 16, wherein each LED driver comprises the primary LDO monitoring the operating voltage to control the charging current and making the charge current not more than the corresponding channel target value.

18. The LED lighting system of claim 10, wherein the primary LDO regulates the operating voltage to a first target voltage, and the LED lighting system further comprises:
a secondary LDO connected to a most upstream anode for charging the capacitor and regulating the operating voltage to a second target voltage less than the first target voltage.

* * * * *